July 11, 1939.  J. G. BAUMGARTNER  2,166,087
WIRE CUTTING MACHINE
Filed Feb. 5, 1938   5 Sheets-Sheet 1

Inventor:
John G. Baumgartner
By Toorman L. Mueller
Atty.

July 11, 1939.  J. G. BAUMGARTNER  2,166,087
WIRE CUTTING MACHINE
Filed Feb. 5, 1938   5 Sheets-Sheet 2

Inventor:
John G. Baumgartner

Inventor:
John G. Baumgartner

July 11, 1939.  J. G. BAUMGARTNER  2,166,087
WIRE CUTTING MACHINE
Filed Feb. 5, 1938  5 Sheets-Sheet 4

Inventor:
John G. Baumgartner
By Froorman L. Mueller
Atty

July 11, 1939.  J. G. BAUMGARTNER  2,166,087
WIRE CUTTING MACHINE
Filed Feb. 5, 1938  5 Sheets-Sheet 5
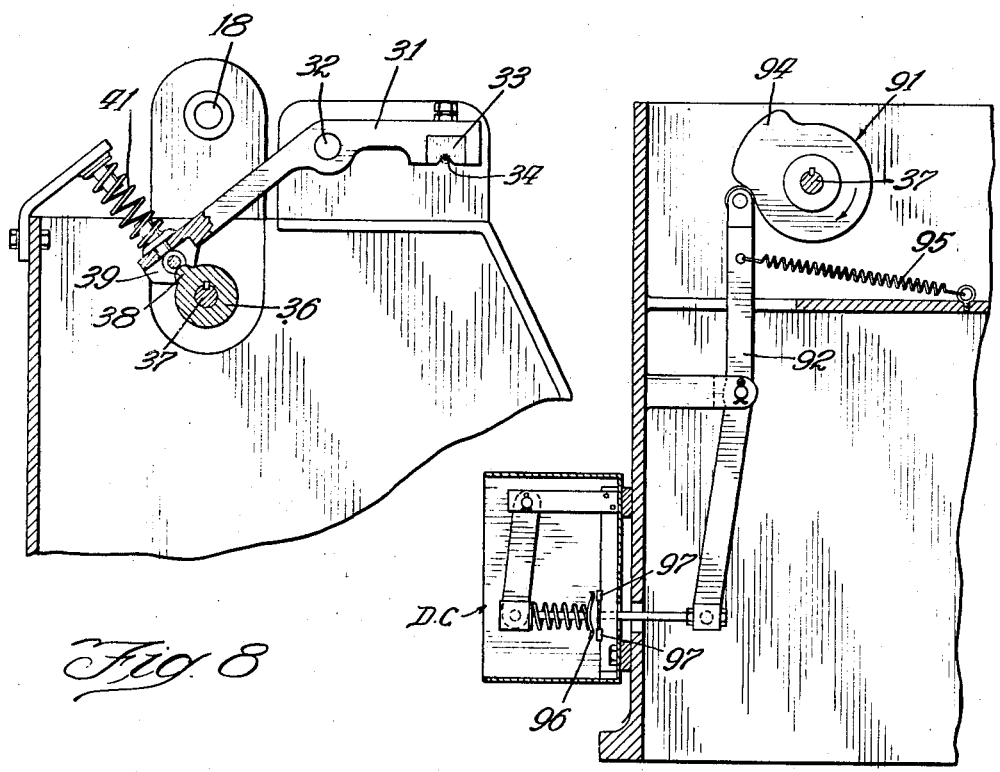
Fig. 8
Fig. 9
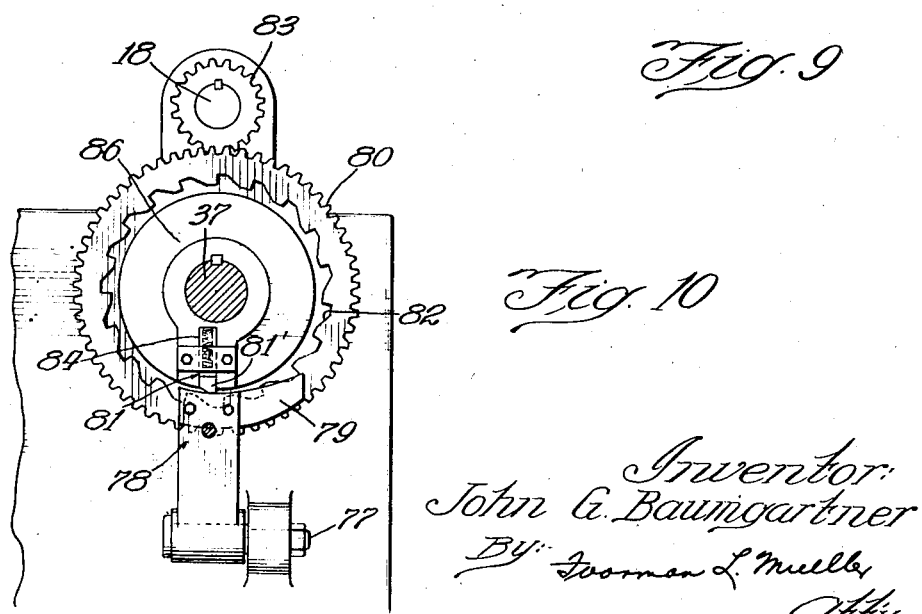
Fig. 10
Inventor:
John G. Baumgartner Patented July 11, 1939

2,166,087

UNITED STATES PATENT OFFICE 2,166,087

WIRE CUTTING MACHINE

John G. Baumgartner, Aurora, Ill., assignor to National Brush Company, Aurora, Ill., a corporation of Illinois Application February 5, 1938, Serial No. 188,973

18 Claims. (Cl. 140—140)

My invention relates in general to metal-working machinery, and more in particular to a machine for automatically feeding wire therethrough and cutting such wire into measured lengths at a high rate of speed.

Automatic machines of different types are employed in various industries at the present time for cutting wire into measured lengths. The wire to be cut varies in size, material, and the like, depending upon the use to which the cut pieces are applied. In all of these automatic, relatively high-speed wire-cutting machines with which I am familiar, however, heavy and clumsy mechanism is used for guiding the wire into measured lengths, and then accomplishing the cutting of the wire into such lengths. As a result of the particular construction of these machines, and deficiencies in the automatic control system therefor, there are complaints as to the lack of accuracy in the wire measuring and cutting operations thereof causing a lack of uniformity in the pieces cut. In addition, with the prior art machines, it has been found that close supervision is required so that the machines may be stopped when the control systems fail to operate. If the machines are not stopped by manual operation the wire becomes entangled, or is fed out of the machines so fast, and in such a manner, as to cause possible damage to surrounding objects or workmen. Furthermore, with the prior art machines considerable time is required to make a setting for a predetermined measurement control, and with some machines there are positive limitations as to the different lengths of wire which may be cut on the same. This condition reduces the flexibility of adaptation for such machines to different wire lengths.

In at least some of the prior art automatic wire-cutting machines, the wire is guided to a measured length by a two-part jaw-like mechanism including a stationary bar and a pivoted bar carrying the wire therebetween, with the latter opening mechanically to release the measured length at the time of cutting. Heavy jarring of the machine and the floor mounting therefor, results from the operation of such machines, and this of course means a relatively short life for the structure. In addition, none of the disadvantages in the control of the prior art machines to obtain uniform lengths of wire, as outlined above, has been overcome in the machines with this guide mechanism.

Furthermore, in the prior art machines with which I am familiar, there is a slightly more than momentary time interval after the feeding movement of the wire through the machine is stopped, yet before the friction is released from the wire at the feed rollers, when the pressure on the wire at the rollers causes them to form a slight indentation in the wire or at least cut through the surface. This is particularly objectionable in the case of a relatively soft wire, or a coated wire. With the former the mark is objectionable, while in the latter case, not only is the mark objectionable, but cutting the coating later causes rust or corrosion to develop on the wire at that point in any article in which it is used.

It is an object of my invention to provide an improved machine for cutting wires into predetermined measured lengths.

A further object of my invention is to provide an automatic wire cutting machine which accomplishes accurate and uniform measurement and cutting for each piece of wire.

A still further object of my invention is to provide in combination with the feeding and cutting mechanism, wire guiding, measuring and control mechanism which causes the wire to pass through the entire machine and be cut into uniform lengths without bulging, becoming entangled in the machine, or overrunning the machine so as to cause damage and injury to nearby objects and workers.

Another object is to provide improved and positive operating control mechanism for the automatic wire-cutting machine of my invention, to provide a high speed, highly efficient device.

A further object is to provide an electric control system for a wire cutting machine which is substantially instantaneous in operation, and acts to remove any undesirable forces on the wire immediately upon actuation of the control system.

It is also an object of my invention to provide a machine for cutting wire into measured lengths which has relatively few heavy movable parts and operates with relatively little noise and vibration.

Another object of my invention is to provide simple and readily adjustable measuring means for actuating the cutting mechanism of the machine so that the machine may be set up in a very few minutes for cutting wire of any predetermined length.

One of the features of my invention is the provision of electro-magnetic guide means in my wire-cutting machine which maintains the wire in a straight line when being fed therethrough to provide an accurate measurement for the length to be cut, which doesn't in any way impede such movement, and then at the proper moment during the cutting operation becomes deenergized to drop the cut piece of wire out of the path of additional oncoming wire.

A further feature of the invention is the provision of an electrical control system for the wire-cutting machine which is initially actuated by the moving wire to be cut and in turn controls the operation of the moving elements of the entire machine so that completely automatic operation is obtained.

The principal advantages of the machine of my invention over the prior art are that it provides an entirely automatic wire-cutting device which is substantially foolproof, accomplishes uniform measurement and cutting of wire to predetermined lengths at a high speed of operation, permits rapid setting thereof for cutting of wire in a substantially infinite variety of lengths, operates so positively that it requires little or no supervision, and furthermore, operates so efficiently and with so little vibration that a long effective life for the machine is obtained.

Other objects, features, and advantages of my invention will be apparent from the following description taken with the drawings, in which:

Fig. 8 is a cross-sectional view of the wire cutter in cutting position taken along the line 8—8 of Fig. 2 and looking in the direction of the arrows shown thereon.

Fig. 9 is a cross-sectional view of the tuning mechanism and switch for controlling the energizing line for the electro-magnets. This view is taken along the line 9—9 of Fig. 2.

Fig. 10 is a cross-sectional view of the clutch mechanism for a portion of the driving mechanism taken along the line 10—10 of Fig. 2.

Figure 1:
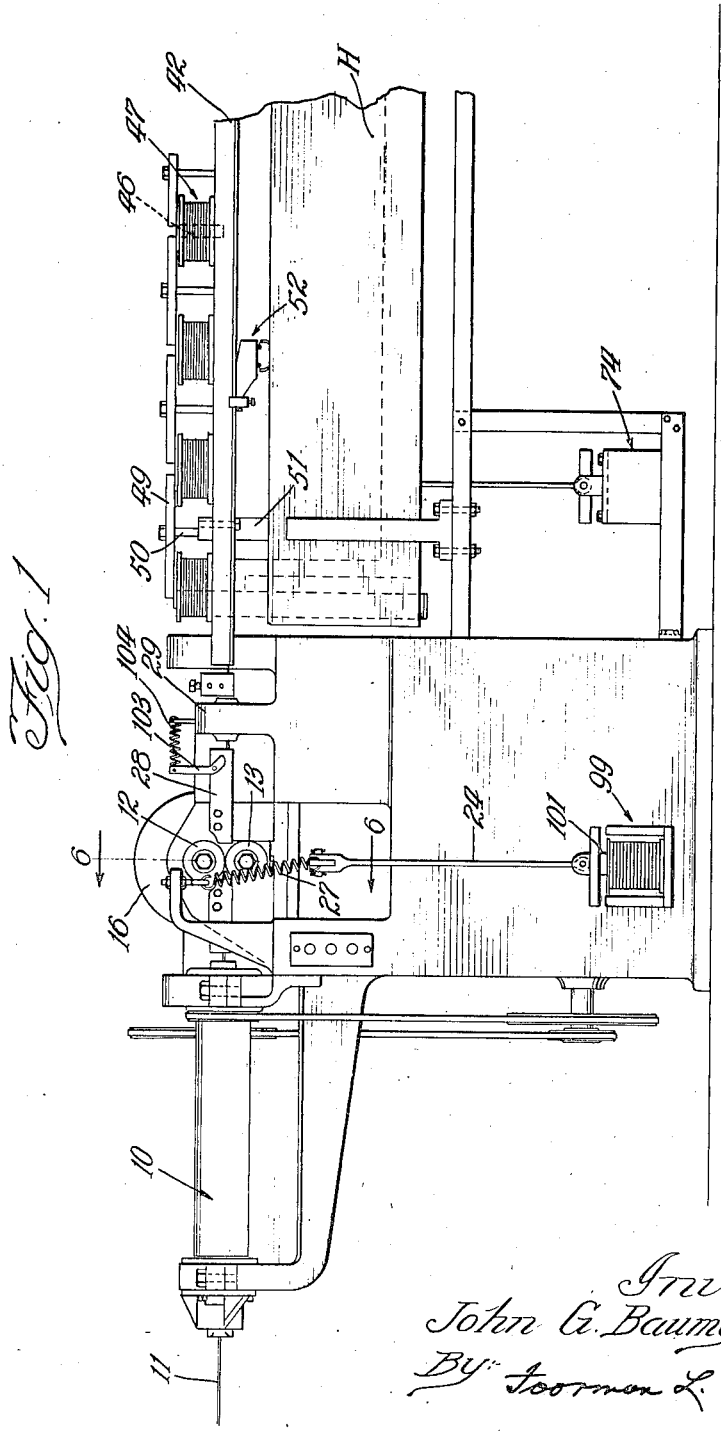
Fig. 1 is a front elevation of the wire-cutting machine of my invention.
Figure 6:
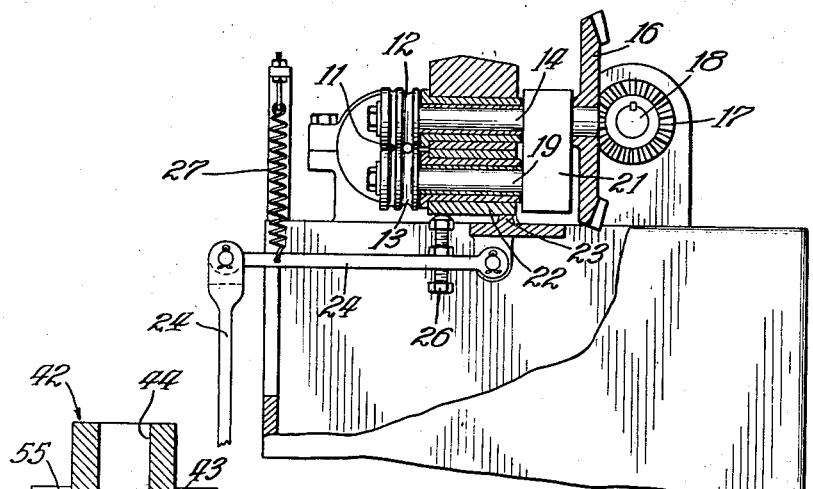
Fig. 6 is a fragmentary cross-sectional view through the wire feed rollers and tensioning structure shown in the front elevation of Fig. 1.

Referring now to Fig. 1 of the drawings, the illustrated embodiment of my invention includes wire straightening dies in a movable portion 10, providing a zig-zag path in the middle thereof to straighten the wire 11 being fed from a mandrel (not shown) in the usual manner. The wire 11 is fed from the mandrel, and through the machine by means of revolving friction feed rollers 12 and 13. As shown in the detailed illustration of Fig. 6, the top roller 12 is driven directly by a shaft 14 which in turn is driven by the bevel gear 16 in engagement with the driving gear 17 on the shaft 18. The tension or bottom roller 13, however, is supported on a rotatable shaft 19 driven by a spur gear connection with the shaft 14 in the frame portion 21. The shaft 19 is pivoted very slightly by a block 22 resting on a pivot point 23, in a manner such that the shaft 19 may be tilted slightly out of horizontal line to vary the frictional pressure on the wire 11 being fed through the machine. The variation of frictional pressure is accomplished by means of a pivoted lever 24 having an adjustable screw 26 therein for engagement against the block 22. A friction spring 27 supported on the frame of the machine above the lever 24 normally holds the lever in the upward or friction feed position of Fig. 6, so that the necessary friction is applied on the wire 11 by the rollers 12 and 13 to move such wire. The friction is removed from the wire and feeding through the rollers stopped as the result of the actuation of the lever 24 as will be explained more fully hereinafter.

The wire 11 passes through a stationary guide member 28 beyond the feeding rollers 12 and 13, and into the stationary portion 29 of the cutting die for the wire. The cutting mechanism includes the apertured stationary portion 29 and a movable arm 31 pivoted at 32 and having a removable die member 33 supported therein to cooperate with the edge of the aperture 34 in the stationary member 29 to shear the wire in the usual manner. The pivotal movement of the arm 31 is accomplished by means of a cam 36 keyed to a shaft 37, and having a raised or cam portion 38 for engaging a corresponding portion 39 on the movable arm or lever 31 riding on the cam. The coiled spring 41 maintains the portion 39 of the arm on the cam.

Figure 5:
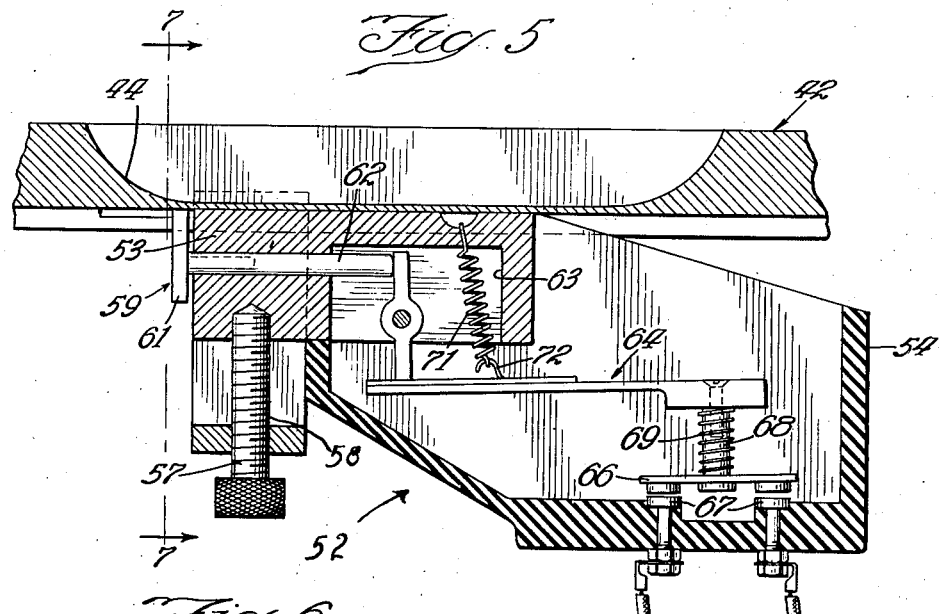
Fig. 5 is a fragmentary view of the electro-magnetic measuring and guide bar with the control switch mounted thereon shown in a vertical sectional view.
Figure 7:
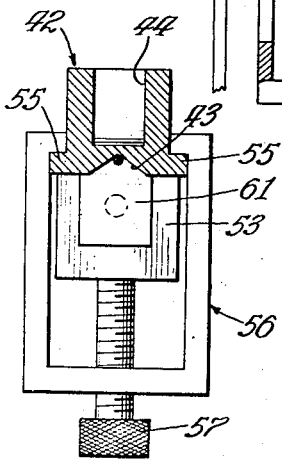
Fig. 7 is a cross-sectional view of the electro-magnetic guide bar and actuating member of the control switch, taken along the line 7—7 of Fig. 5.

In wire-cutting machines, the cutting structure itself accomplishes the ultimate purpose of the machine, but it is the timing or measuring, and actuating mechanism which governs the operation of the cutting structure and hence determines the success of the machine as a whole. As discussed above, in the embodiment of my invention the problems of the prior art as to this mechanism have been solved, and a high-speed automatic wire-cutting machine is provided. Before actual cutting, a piece of wire must be fed and guided to a measured length, after which such length is sheared or cut from the remaining material. In this embodiment of the invention the wire 11 initially is fed past the cutting die into the guiding and measuring portion of the machine which comprises a stationary bar 42 selectively magnetized by electro-magnets thereon as will be explained. The bar is shown in elevation in Fig. 1 but its construction can be understood more clearly from the cross-sectional and sectional views of Figs. 5 and 7. The bar may be of any length so as to accommodate wire lengths ranging from a few inches to many feet. The capacity of the machine in this respect, in general, is limited only by the available space for mounting the same. The bar is provided in material suitable for electro-magnets with an inverted V-shaped channeled portion 43 along the bottom thereof. The wire 11 is carried at the apex of the channel as shown in Figs. 5 and 7. At spaced intervals along the upper portion of the bar 42, I provide a series of separated cavities 44 (Fig. 5) cut to a depth so that there is only the minimum supporting portion at the bottom for adjustably receiving the core 46 of any one of a plurality of electro-magnet coils 47. The bottom portion is as thin as possible so as to provide as strong a magnetic field as possible at the channel 43. The coils 47 are preferably provided in pairs on the magnet bar 42 so that one will be the north pole in the magnetic circuit and the other the south pole. Each coil 47 with core 46 is of substantially standard construction and each pair of coils includes a removable outer pole piece 49 in engagement with each of the cores 46 and clamped in place by bolts 50 which likewise secure the coils in rigid position. With the bar 42, a complete magnetic circuit through metal is provided for each pair of coils.

Figure 2:
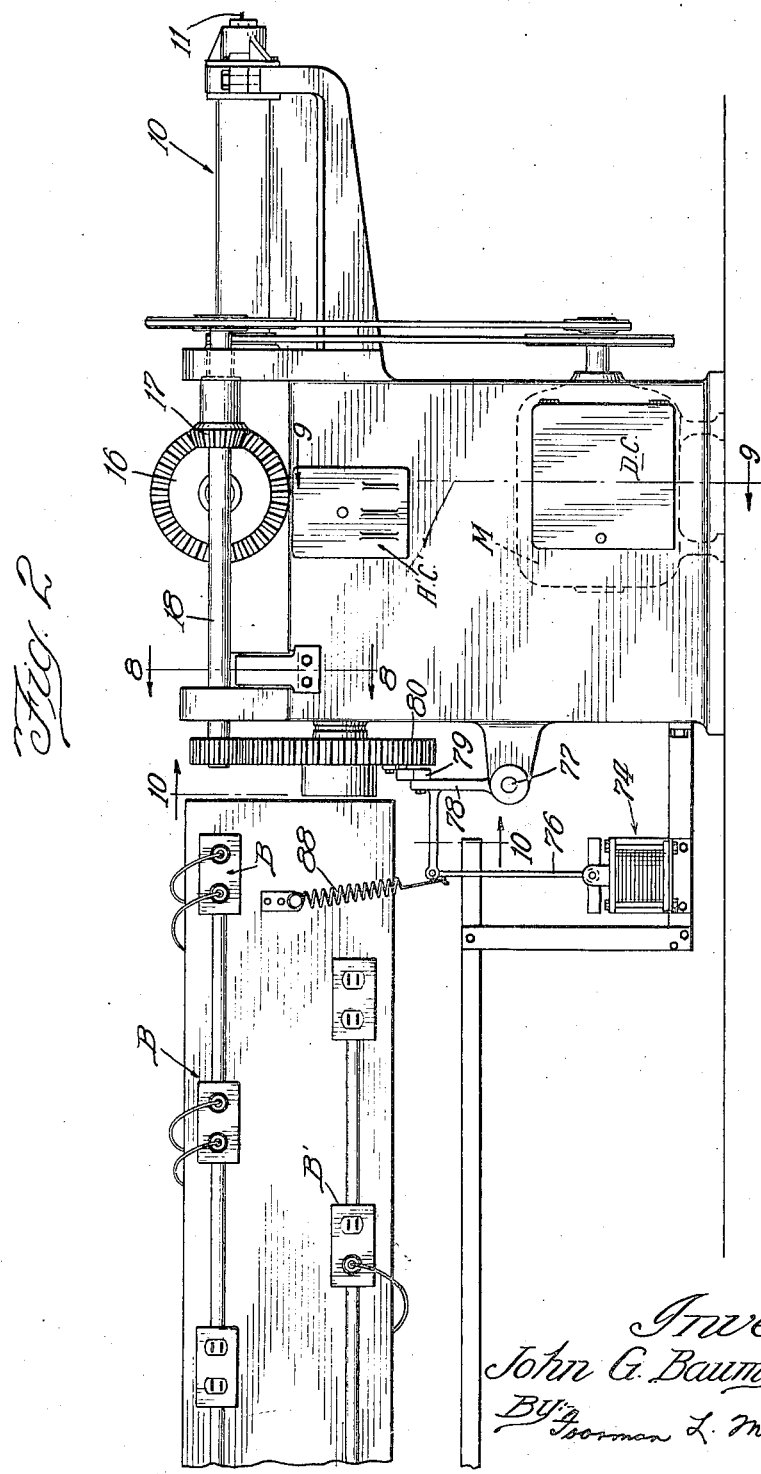
Fig. 2 is a rear elevation thereof.
Figure 3:
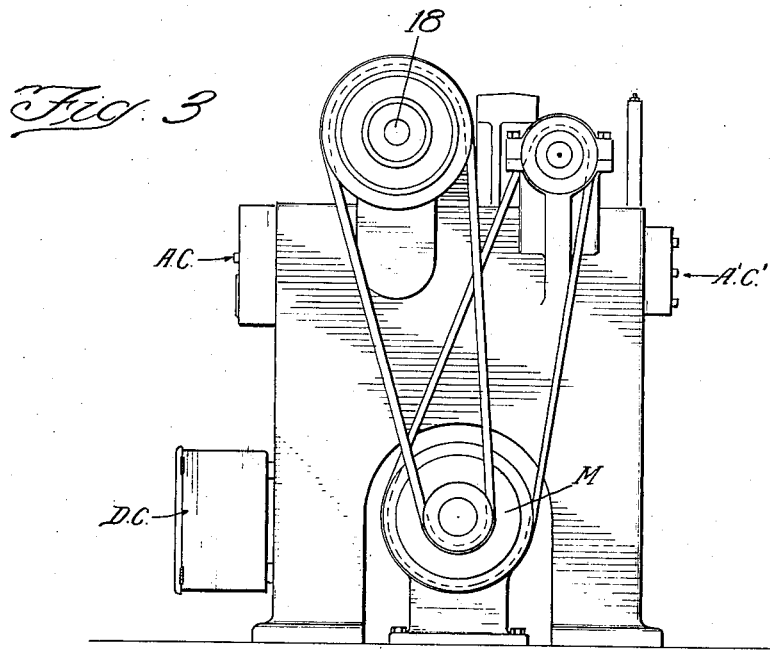
Fig. 3 is an end elevation looking at the right-hand end of the machine as viewed in Fig. 2.

The electro-magnets including the coils 47 are energized by direct current supplied by a line connected into the outlet boxes B (Fig. 2). The receptacles in the outlet boxes are connected in parallel and as many coils as are necessary to magnetize the desired length of guide bar are connected into the circuit.

The magnet bar 42 is appropriately supported by means of brackets 51 of such construction and positioned in such a manner on the machine frame that there is no interference with the ready mounting and adjustment of the electro-magnet structure on the bar 42, nor with the control switch 52 adjustably mounted on the bar 42 as will be described. A hopper H for the cut pieces of wire is likewise supported on the brackets 51.

The control switch 52 comprises a housing which in the form illustrated in Fig. 5 includes a metal mounting block 53 with an insulating box 54 secured thereto. The housing is supported on the bar 42 by means of an adjustable clamp 56 (Fig. 7) hooked over the outwardly extending flanges 55 of the bar 42 and secured to the switch housing by means of a set screw 57 extending into the cavity 58 in the portion 53 of the housing. An actuating member 59 on the switch comprises a face plate 61, with the top edge thereof (Fig. 7) corresponding in shape to that of the channel 43 of the bar 42. A supporting arm 62, at right angles to the face plate, rides in a corresponding aperture in the switch housing and extends into the cavity 63 for engagement with a pivoted lever 64 carrying a contact member 66 on the outer end. The lever 64 is substantially Z-shaped and so dimensioned that a relatively slight movement of the member 59 (in the commercial embodiment the member 59 moves $\frac{1}{16}''$ against a positive stop at the housing 53) will cause such lever to press the plate 66 into engagement with the two contacts 67 supported in the housing and connected to the A. C. supply for the machine through an outlet box B'. A number of such boxes are provided at spaced intervals on the frame of the machine so that a connection is convenient at any adjusted position of the switch on the bar 42. The contact plate 66 is slidably carried on a pole or the like 68 on the lever 64 and retained under tension thereon by means of a spring 69 surrounding the pole.

In making contact between the plate 66 and the two contact members 67 the lever movement continues beyond the point where contact is originally made and the tension thus built up in the spring 69 acts to make a more firm physical contact and consequently a more positive electrical connection. The slight movement (as stated above—$\frac{1}{16}''$ in one embodiment) of the member 59 and the lever 64 before contact is made at 67 is taken into consideration in setting the switch at a predetermined point on the bar 42 for measuring the length of the wire pieces to be cut. The distance from the contact position of the switch to the end or cutting face of the stationary die portion 29 represents the length of the wire to be cut. The spring 71 extending from the switch housing to an appropriate hook 72 on the lever 64 pulls the lever back to idle position when the wire is cut and drops away from the face plate.

The cam shaft 37 which rotates the cam 36 to pivot the movable arm 31 of the cutting die is driven by the drive shaft 18 upon releasing a clutch 78 which in turn is actuated by a lever 76 pivoted at 77 on the machine frame. The solenoid 74 connected to switch 52, is energized upon closing of the switch, and when energized, pivots the lever 76. The clutch includes a cam shaped member 79 positioned adjacent the geared wheel 80 to normally hold a spring-pressed dog 81 out of engagement with a ratchet tooth 82 on the wheel 80 in an internal cavity thereof. The dog 81 has a right-angled ear 81' for engaging the member 79 on the clutch, and is slidably carried in a notch 84 in a fly-wheel-like member 86 keyed to the cam shaft 37. When the clutch 78 is released by movement of the lever 76, the dog 81 drops into a notch or tooth 82. The geared wheel 80 is driven by the gear 83 on the shaft 18 and constantly rotating so that when the dog is tripped, the wheel 86 and shaft 37 immediately rotate therewith. At the end of a single rotation the dog 81 rides onto the cam surface of the member 79 for release from the ratchet tooth 82 to in turn disconnect the cam shaft 37 from driving connection with the shaft 18. The dog 81 has been released from a ratchet tooth 82 in the position shown in Fig. 10.

Upon rotation of the shaft 37 during the interval mentioned above, a cam 91 secured to the shaft 37 is rotated in the direction of the arrow shown on such cam in Fig. 9 to pivot the lever 92 which in turn opens and closes the switch DC for controlling the direct current supply through the outlet B to the electro-magnets on the bar 42. In the position of the cam 91 shown in Fig. 9, the roller on the end of the lever 92 has just passed off of the cam or raised portion 94. The spring 95 pulling on the lever 92 pivots the same so as to break the circuit through the switch DC by moving the contact 96, away from the stationary contacts 97. The position of the cam 91 and shaft 37, as illustrated in Fig. 9, corresponds with the position of such shaft and the cam 36 as illustrated in Fig. 8. The cutting lever 31 on the cam 36 is at the end of the shearing or cutting stroke, while the circuit through the switch DC is broken as the lever rides off the portion 94 slightly in advance of the actual cutting of the wire, so that the cutting stroke drives the cut piece of wire into the hopper H and out of the path of the oncoming wire.

When the switch 52 is actuated by the moving wire to energize the solenoid 74 as above described, a solenoid 99 is also simultaneously energized. Energizing the solenoid 99 draws the core 101 thereof into the coil, to in turn pivot the lever 24, as can be seen from Figs. 1 and 6. The lever is pulled down against the tension of the spring 27 to drop the adjustable screw 26 away from the plate 22 and in turn cause the shaft 19 to pivot at 23. The shaft 19 pivots only very slightly but sufficiently to drop the roller 13 from its feeding position and remove the spring pressure on the wire 11 and roller 12, so that the rollers 12 and 13 can no longer feed the wire through the machine. With the tension at the rollers 12 and 13 removed substantially simultaneously with the closing of the switch contacts 66—67, the movement of the wire immediately stops so that the measured length of wire between the cutting die and switch 52 exactly equals the desired predetermined lengths and there is no bulging in the wire, nor overrunning the control switch. In the prior art machines employing a mechanical control for the tension at the feed rollers there was a slight lag in the release of the tension, and with the wire stopped against a control member, the feeding movement was stopped momentarily and yet the tension was still effective. As a result the feed rollers cut into the wire coating slightly, or left an impression which was objectionable from an appearance standpoint, and caused rust to occur at that point. The instantaneous release of tension with my electrical control overcomes this difficulty.

Merely as a safeguard against any backfeed of the wire in the machine at the time of actuating the switch, so as to disturb the measurement of the wire, a friction locking device is provided on the guide member 28 which comprises a pivoted lever 103 having a cam-shaped end riding on the wire 11. The feeding movement of the wire is sufficient to keep the lever 103 in a non-braking position but as soon as the feeding movement stops the pressure of the spring 104 pulling on the lever causes the latter to frictionally engage the wire and hold it locked in position at the cutting die.

Figure 4:
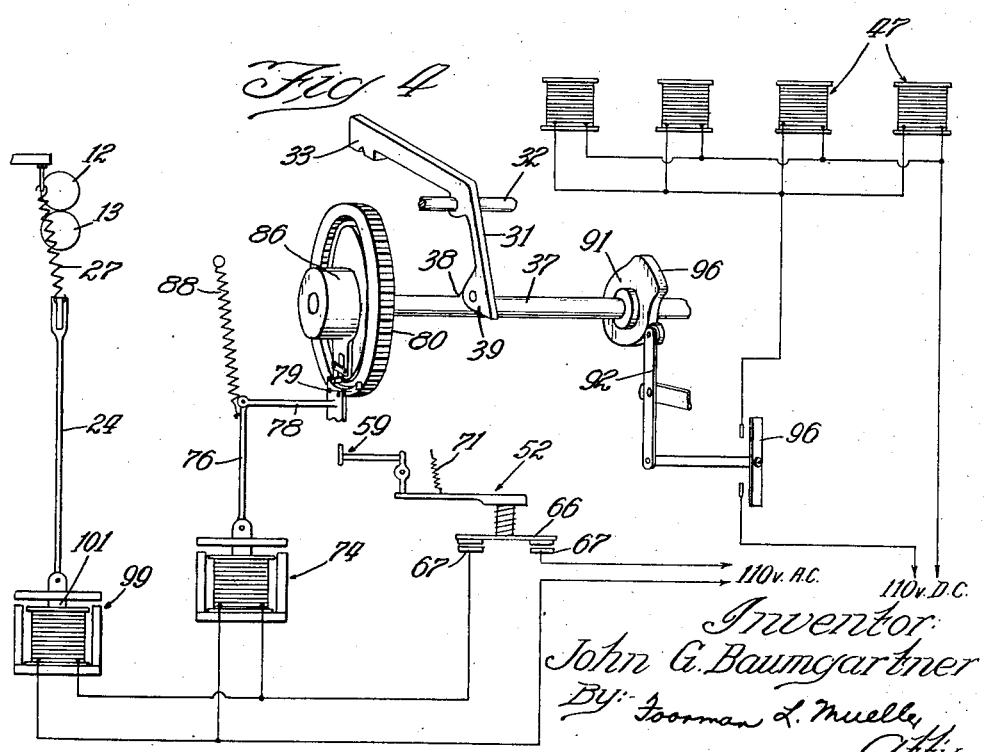
Fig. 4 is a schematic diagram of the electrical and mechanical portions of the control system for the machine of my invention.

Although the operation of the machine can probably be understood from the preceding description of its various elements, a brief description of the various steps in order will undoubtedly aid in this understanding. The switch 52 is first clamped onto the flanges 55 of the bar 42 at the desired measured distance from the shearing face of the stationary cutting die member 29. A scale can be marked off on the face of the bar 42 so that this setting operation may be accomplished very quickly. The clamp 56 is then tightened onto the bar 42 so that the switch 52 will be perfectly rigid with respect thereto. The appropriate number of coils 47 and associated elements, depending upon the length of the wire to be cut are then positioned in the channels 44 in the bar 42 and clamped into place. The coils 47 are connected at the appropriate outlet B as shown in Fig. 2, for connection to the direct current supply as can be understood from the diagrammatic illustration of Fig. 4. Similarly, the switch 52 is connected at the most convenient outlet B' to connect it to the alternating current supply. The end of the wire 11 is then removed from an appropriate mandrel to the left of the machine as viewed in Fig. 1 and fed by hand through the straightening die portion 10 and succeeding guide portions to lay between the feed rollers 12 and 13. The switch AC connected directly to the alternating current supply is operated to energize the magnetic switch A'C' to start the motor M.

Inasmuch as the solenoid 99 is connected directly to the switch 52, and is energized only momentarily with the closing of the contacts in the switch, to in turn remove the spring tension through the feed roller 13 only momentarily, such spring tension will normally be effective whenever the switch AC is operated, so that feeding of the wire through the rollers and then the remainder of the machine will begin immediately with the rotation of the motor M. Ordinarily the clutch mechanism for the shaft 37 will be in idle position when the machine is set in operation. If the clutch 78 has not disengaged the dog 81, immediately upon actuating the switch AC, the shaft 37 will turn until the dog 81 is released at which time the circuit at DC will be made and the electromagnets energized to magnetize the guide bar 42. The roller on the end of the lever 92 is stopped on the top of the cam portion 94 of the cam 91 when this occurs. One convenient direct current supply is from a generator operated or driven by connection with the motor M. Current may therefore, be fed to the stationary contacts 97 on the switch DC immediately upon starting the motor M.

Upon rotation of the shaft 18 by the motor M, as above described, the wire 11 feeds through the guide sleeve 28 and cutting die 29 into the channel 43 of the guide bar 42. The bar 42 is magnetized sufficiently to hold the wire 11 at the apex of the guide channel 43 as shown in Fig. 7, yet the magnetic field is not so strong as to in any way impede the feeding movement of the wire along this channel.

When the moving wire 11 engages the face plate 61 and moves the same, contact is immediately made in the switch 52 at 66—67 and solenoids 74 and 99 are simultaneously energized. The solenoid 99 acts to pivot the lever 24 to remove the friction due to spring tension on the wire 11 at the rollers 12 and 13 and the feeding movement stops. The energization of the solenoid 74 pivots the lever 76 to release the clutch 78 and trip the dog 81 so that the shaft 37 is driven, through gears, by the shaft 18. As the shaft 37 rotates, the magnet circuit is broken when the lever 92 rides off of the portion 94 of the cam 91, causing pivotal movement of the lever and operating the contacts at 96—97 in the switch DC. The magnet circuit is broken as the cam 36 pivots the lever 31, with the cutting die 33 thereon, into cutting position so that the cut piece of wire will be pushed downwardly into the hopper H by the final movement of the arm 31 in the cutting stroke.

In the meantime, as was described above, the lever 24 has been actuated simultaneously with the lever 76 so as to release the spring pressure or tension on the feed roller 13 and thus immediately stop the feeding movement of the wire as the solenoid energizing circuit is completed at the switch 52. Furthermore, backfeed of the wire in the machine is prevented by the locking mechanism including the pivoted arm 103, so that the measured length of wire is accurately maintained between the switch 52 and cutting dies.

It is understood that the speed of operation of all of the various elements entering into the complete measuring and cutting operation described above is extremely fast. As an example of one particular run No. 14 gauge steel wire was cut into 18" lengths at the rate of 60-70 pieces per minute. This example is not to be considered as a limitation in any way upon the invention, because this speed has been varied. This merely illustrates, however, the relatively high speed of operation obtained. Furthermore, this rate of speed has been maintained over long periods of time with practically no supervision of the machine, and with absolute uniformity of length in the cut pieces. As a result the efficiency of the machine is extremely high. This high speed automatic operation, furthermore, has been obtained with a very small amount of vibration in the machinery, so that a long effective life of the machine is expected with low maintenance cost.

From the above description it can also be understood that the length of the bar 42 is limited only by the available space for mounting the machine, so that the wire cutting capacity so far as length is concerned is substantially unlimited. A light piece of wire a few inches in length can be cut just as satisfactorily as one of heavy gauge and many feet in length, the only variations in the machine being in the number of electro-magnets employed on the bar 42, and the position of the switch 52.

Although I have described my invention in its preferred embodiment, it is understood that it is not limited to this specific structure, but is limited only by the scope of the appended claims.

I claim:

1. In a wire-cutting machine, in combination, wire-cutting means, guide means positioned on one side of the cutting means for guiding a measured length of wire to be cut and continuously open in one portion for release of wire therefrom after the cutting of the wire, stationary magnetic means for retaining said wire in said guide means prior to cutting the wire, and feeding means positioned on the other side of the cutting means for feeding wire through said cutting means into said guide means.

2. A machine for cutting wire into measured lengths including a selectively magnetized stationary portion for magnetically retaining moving wire therein, means for moving wire therein, measuring and release means on said magnetized stationary portion for engagement by the end of the moving wire, and a cutter spaced from said means in the line of movement of the wire acting in response to the engagement of said wire end and said means to cut the wire into a predetermined length.

3. In a machine for cutting wire into measured lengths, a magnetic measuring portion for carrying wire therein for a predetermined distance, means at one end of said measuring portion for cutting the wire, and means at the other end of the measuring portion for engagement by the moving wire for initiating the cutting operation by said cutting means and simultaneously with said initiating action to cause the deenergization of the magnetic measuring portion for release of the wire therein.

4. In a wire-cutting machine, in combination, a pair of feed rollers for feeding wire through the machine, magnetic guide means for the fed wire, and cutting means on said machine positioned intermediate said feed rollers and magnetic guide means, a single control unit for said feed rollers, guide means, and cutting means for causing the stopping of said feed rollers and initiating movement of said cutting means, and substantially simultaneously therewith causing deenergization of the magnetic guide means whereby to accomplish cutting of a length of the fed wire and the release of the cut length from the machine.

5. A wire-cutting machine including in combination means for feeding wire through the machine, a movable wire-cutter in the path of movement of said wire, an inverted guide channel, means for retaining the moving wire in said guide channel without interfering with the movement thereof, and a control device at a predetermined position in said guide channel for engagement by the wire for initiating movement of said cutter to cut a predetermined length from said wire and releasing the retaining means whereby the cut wire drops from said channel.

6. A wire-working machine including in combination, wire straightening means, means for pulling said wire through said straightening means and feeding said wire through said machine, a stationary electro-magnetic guide unit for defining the path of movement of the straightened wire, and a control member on said guide unit for engagement by said moving wire for causing deenergization of said unit.

7. A wire-working machine including in combination, wire straightening means, tensioned feeding means for pulling said wire through said straightening means, guide means for guiding said straightened wire, said guide means including an elongated stationary electro-magnet having an inverted guide channel therein for carrying said moving wire in said channel against the top thereof, and open at the bottom, and means for releasing the wire from said channel to drop through the open bottom.

8. A wire-working machine including in combination, wire moving means, a magnetic guide unit for supporting the moving wire and defining the path of movement thereof, a control device on said unit for engagement by the moving wire, an energizing current circuit for said unit, a switch in said circuit for opening and closing said circuit, a rotatable cam shaft on said machine for operating said switch, and means responsive to the engagement of said control device by said wire for causing rotation of said cam shaft.

9. A wire-working machine including in combination, wire-feeding means including a pair of driven feed rollers for supporting the wire therebetween, tensioning means acting on one of said rollers for moving said roller toward the other roller in a manner to frictionally engage the wire sufficiently to feed such wire therethrough upon rotation of said rollers, electrical means acting to vary said tension, guide means for retaining said fed wire in a definite path, and a control switch on said guide means for engagement by said fed wire and connected with said electrical means for causing energization of said electrical means upon engagement of said switch by said wire to remove the tension on said one roller and stop the feeding movement of the wire.

10. A wire-cutting machine including in combination, wire-feeding means having tensioning means thereon to cause feeding of the wire through the machine when the tension is applied, a movable wire cutter in the path of movement of the fed wire, means for guiding said fed wire for a predetermined distance, a control switch on said guide means for engagement by the fed wire, electrical means connected with said control switch acting substantially simultaneously with the engagement of said switch by said fed wire to release the tension on said feeding means and initiate the movement of said wire-cutter whereby said fed wire is stopped and a predetermined length is cut therefrom.

11. A wire-cutting machine including in combination, a tensioned wire feeding portion, a magnetic guide portion for the wire having an energizing source therefor, a wire cutter intermediate said feeding portion and guide portion, a rotary drive shaft and a rotary driven shaft having cutter driving means thereon, clutch means for connecting said shafts and electrical means for operating said clutch, electrical means for varying the tension on the feeding portion, an energizing circuit for said magnetic guide portion having a switch therein and means operable upon rotation of said driven shaft for actuating said switch, and an electrical control device on said guide portion connected with said two electrical means for actuation by the fed wire to energize said two electrical means for substantially simultaneously stopping the feeding of the wire and causing rotation of the driven shaft to operate the cutter and deenergize the guide portion whereby a length of wire is cut and released from the machine.

12. An electric switch including a housing, having two end walls, two sidewalls and a bottom, an actuating member having an arm slidably mounted in an aperture in one end wall, stationary contact means in the bottom of said housing, and a contact unit intermediate said actuating member and stationary contact means for opening and closing a circuit through the switch, said contact unit comprising a center bar, a pivotal bar at one end thereof and extending at right angles thereto for pivotally supporting said unit, and a contact bar at the other end of said bar extending at right angles therefrom in a direction opposite to the pivotal bar, with means on said contact bar for engaging said stationary contact means.

13. Guide means for moving metal material, including an elongated magnetizable member defining the path for movement of said material, magnet means mounted upon said member to magnetize the same, and means for energizing the magnet means whereby said moving metal material is attracted to said member and guided thereon without interference with said movement.

14. Magnetic guide means for a moving wire including an inverted channeled bar magnetized sufficiently to retain said moving wire in the channel thereof yet not enough to interfere with the movement of said wire therein, and control means on said bar responsive to engagement by said moving wire for releasing said wire from said channel.

15. Electro-magnetic guide means for a moving wire including an elongated magnetizable bar having a channel longitudinally thereof on the underside thereof, a plurality of separated longitudinally extending cavities opening from the top of the bar, with each cavity adapted for carrying a magnet core therein, with at least one magnet core on such bar, a magnet coil for such core, a control switch adjustably supported on said bar having a movable switch element positioned in said channel for engagement by said moving wire, means for energizing said magnet coil to magnetize said bar to support the wire in the channel, and means responsive to movement of said movable switch element by said wire for disconnecting said energizing means to cause the release of said wire from said channel.

16. A machine for operating on movable metal material at predetermined intervals, said machine including in combination a stationary guide channel for said material, said channel being substantially closed at the top and continuously open at the bottom to permit material to fall therethrough after being operated upon, means for moving said material through said guide channel, magnetic means for retaining said material in said guide channel during said moving, means for operating on said material at predetermined intervals, and means in the path of movement of said material for initiating actuation of said operating means.

17. In a cutting machine, tensioned rotating rollers for carrying therebetween material to be cut and engaging said material to move the same through the machine, electrically operated means for varying the tension on the rollers, means for cutting said material, means for measuring the quantity of material to be cut and acting to control the operation of the cutting means including electric switch means in the path of movement of said material, electrical connecting means between said switch means and said electrically operated means, with said switch means acting upon engagement by said moving material to initiate operation of said cutting means and substantially simultaneously therewith cause operation of said electrically operated means to remove the tension through said rollers upon said material and stop the movement of said material through said machine and prevent an undesirable marking on the material between the rollers which would normally occur due to tension being applied on said material through said rollers while the material was stationary therebetween.

18. A cutting machine including in combination, feeding means for moving material to be cut through said machine, tension means acting on said feeding means to provide frictional engagement between said feeding means and the movable material therein, a movable cutter in the path of movement of said material, electric means for controlling the operation of said tension means and said cutter, and a control switch in the path of movement of said material electrically connected with said electric means adapted to be engaged by said moving material at a predetermined position thereof to energize said electric means and substantially simultaneously initiate operation of said cutter and move said tension means to remove the friction intermediate said feeding means and said material.

JOHN G. BAUMGARTNER.